United States Patent [19]

Enns et al.

[11] 3,900,377
[45] Aug. 19, 1975

[54] REDUCTION OF TOXICITY OF AQUEOUS SOLUTIONS

[76] Inventors: Kurt Enns, 345 Dale Crescent; John J. Byerley, 154 Chelford Crescent; Clare J. Beingessner, 505 Oxbow Rd., all of Waterloo, Ontario, Canada

[22] Filed: Jan. 8, 1973

[21] Appl. No.: 322,085

[52] U.S. Cl.................................. 204/149; 204/130
[51] Int. Cl............................................... C02c 5/12
[58] Field of Search ............ 204/149, 130, 269, 150

[56] References Cited
UNITED STATES PATENTS

| | | | |
|---|---|---|---|
| 478,048 | 6/1892 | Collins | 204/149 |
| 744,171 | 11/1903 | Davis et al. | 204/269 X |
| 831,434 | 9/1906 | Hinkson | 204/269 X |
| 1,894,271 | 1/1933 | Hansel et al. | 204/269 |
| 2,044,888 | 6/1936 | Overdick et al. | 204/269 X |
| 2,520,703 | 8/1950 | Wagner | 204/149 X |
| 2,737,298 | 3/1956 | Hendel | 204/149 |
| 3,645,867 | 2/1972 | Ericson et al. | 204/130 |
| 3,756,932 | 9/1973 | Zievers et al. | 204/149 |

Primary Examiner—John H. Mack
Assistant Examiner—A. C. Prescott
Attorney, Agent, or Firm—Sim & McBurney

[57] ABSTRACT

The toxicity of waste solutions, particularly cyanide wastes, is reduced using electro-oxidation. A cell structure suitable for accomplishing the result and including an extensive liquid flow path between closely-spaced electrodes is provided.

11 Claims, 6 Drawing Figures

PATENTED AUG 19 1975

REDUCTION OF TOXICITY OF AQUEOUS SOLUTIONS

The present invention is concerned with the reduction of toxicity of aqueous solutions, more particularly to the reduction of the concentration of anodically oxidizable soluble materials in waste liquors, particularly cyanide wastes.

Aqueous solutions of cyanides which are waste materials arise in many industries and represent a difficult disposal problem. The cyanide may be present in such wastes in free and/or complexed form. The term "cyanide ions," as used herein, is intended to include free and/or complexed ions. Such waste solutions are extremely toxic and hence cannot be discharged to water bodies. A number of suggestions have been made for the reduction of the cyanide concentration of such aqueous solutions and those practised commercially involve chemical treatments with hypochlorite, chlorine or ozone. Such chemical operations require expensive equipment and expert maintenance, generally produce secondary pollutants and are expensive to operate. Thus, for hypochlorite treatment using added hypochlorite ion (usually as NaOCl), while substantially no capital equipment is required, the operating cost is about $3 to $5 per pound of cyanide ion destroyed. Where alkaline chlorination is used, i.e. forming hypochlorite ion in situ from chlorine and sodium hydroxide, the smaller units costing approximately $18,000 and operating costs are in the region of $1.30 to $1.80 per pound of cyanide ion destroyed. In the case of ozonation, capital costs are even higher, involving, for the smaller units about $25,000 to $30,000 and operating costs of 40 ¢ to 60 ¢ per lb. $CN^-$ are reported.

In accordance with the present invention the toxicity of the aqueous cyanide solution is reduced electrochemically. The electrochemical process of the present invention rapidly reduces the toxicity of cyanide containing aqueous solutions and converts the cyanide ions to relatively harmless by-products. The process of the present invention provides an inexpensive manner of destroying by-product waste cyanide. The present invention further provides a reactor of novel construction for carrying out the electrochemical process.

While the present invention is particularly directed to the treatment of cyanide ion-containing solutions, it also may be utilized to treat solutions containing other anodically oxidizable species, such as cyanate and thiocyanate ions.

The electrochemical process of the present invention involves the electrochemical oxidation (hereinafter referred to as "electro-oxidation") of cyanide ions at anodic surfaces. It is theorized that cyanide is oxidized by adsorbed oxygen on the anode which is produced by anodic oxidiation of $OH^-$. The process is carried out using a large electrode surface area. The large surface area may be provided in a single reactor, or in a plurality of reactors operating in series or in parallel. In providing the large electrode surface area, while generally the anodic and cathodic surface areas are substantially the same, in some instances it is preferred to provide a larger anodic surface area than cathodic surface area.

In the novel cell construction of the present invention, such large surface area is provided in a small compact modular unit. The cell preferably utilizes a plurality of sheet-like electrodes. Adjacent electrodes are closely-spaced apart and each facing pair defines therebetween a liquid flow channel. Liquid communication means is provided between successive flow channels to provide a liquid flow path through the cell in which the liquid passes successively across the faces of each pair of adjacent electrodes. Typically, the electrodes are flat sheets positioned in parallel horizontal planes with openings being provided through each sheet close to one periphery thereof. The openings are provided in this typical construction at opposite peripheries of each successive sheet electrode.

The novel cell construction of the present invention represents only one manner in which cyanide solutions may be treated in accordance with the process of the present invention. Other manner of providing a large electrode surface area for the electrochemical reaction may be employed. The surface area of electrodes required in the process of the present invention depends on a number of factors, including current density, concentration of material to be electrochemically treated and flow rate. Typically, surface areas of about 68 to 70 sq. ft. may be satisfactorily utilized to treat, for example, wastes arising from cyanide heat treating operations, discussed in more detail below.

The space between the adjacent anodic and cathodic electrode faces of the large surface area cell is maintained small to minimize power losses due to heat. Preferablly, the electrodes are positioned one-eighth to three-eighths inches apart, although the gap may be from one-sixteenth to one inch, if desired. The closely spaced electrodes define a channel of narrow depth, the sides of which are confined, thereby allowing liquid to flow from one end to the other across and in contact with the electrode faces, and be electrolyzed between the electrodes when a potential is applied between the electrodes.

By utilizing a large surface area of electrode in the cell it is possible to operate the cell at a high current while maintaining an overall low current density. Since the power efficiency (i.e. Kwhr/lb $CN^-$) of electro-oxidation of $CN^-$ decreases with increasing current density and additionally high current densities lead to increased rates of electrode erosion, it is advantageous to employ low current densities. To preserve electrode life and achieve satisfactory efficiencies of conversion, it has been found that current densities below about 40 amp.per sq.ft. are preferred. Typical current density values are from 20 to 40 amp.per sq.ft.

In the electrochemical treatment of $CN^-$ by the process of the present invention, the electrochemical reactions, described in more detail below, convert the $CN^-$ at the anode mainly to nitrogen and carbon dioxide. The carbon dioxide is dissolved in the solution, generally forming carbonates, while the nitrogen remains in gaseous form. Further, hydrogen and some oxygen form at the cathode and anode respectively by electrochemical dissociation of water. In some instances, small quantities of ammonia also may be formed.

The aqueous solution passing through the cell, therefore, is associated with gaseous products, which tend to dilute and disperse the electrolyte. If the proportion of gaseous products as compared to liquid is allowed to reach a high level, than contact between the electrolyte and the electrode, which is essential to the electro-oxidation of $CN^-$, is reduced considerably and a much larger cell is required to achieve a satisfactory rate of $CN^-$ conversion. Further, the electrical conductivity of gas/liquid froths at high gas concentrations is considerably lower than the corresponding gas-free solution and hence considerable power losses result at such high gas concentrations.

In the process of the present invention the gas/liquid ratio is maintained at a low level throughout the liquid path through the cell so that a satisfactory degree of liquid/electrode contact is maintained throughout the cell and hence satisfactory efficiencies of $CN^-$ conversion and low power losses are achieved.

The gas/liquid ratio is controlled by controlling the flow rate of the liquid over the electrode faces and the current density. Typically, these parameters are varied to maintain a gas content of the liquid at the end of the liquid flow path of less than about 20 percent, preferably less than about 10 percent and, therefore, less than 20 percent gas is maintained at all stages of the liquid flow path.

As previously mentioned, the electro oxidation of cyanide ions occurs at the anode surface and hence the concentration of $CN^-$ ions at the anode surface tends to be less than in the bulk solution, thereby establishing a $CN^-$ polarization between the bulk electrolyte and the solution adjacent the anode surface. Since the rate of electro-oxidation of $CN^-$ ions is proportional to the concentration of $CN^-$ ions at the anode surface, the greater the $CN^-$ polarization, the lower is the rate of electro-oxidation. High $CN^-$ polarization therefore results in low current efficiencies and high power requirements.

The $CN^-$ ions may migrate from the bulk of the solution to the anode surface in a number of ways, including ionic migration, diffusion or convection. Of these mechanisms, the latter is the most effective under the conditions which exist in most industrial waste cyanide-containing solutions. The $CN^-$ polarization tendency in the process of the present invention is minimized by providing a high degree of convection between the bulk of the electrolyte and that adjacent the anode surface. The liquid adjacent the electrode surfaces may be identified as anolyte and catholyte.

In the process of the present invention, the liquid is maintained at a flow rate sufficient to achieve mixing of bulk solution with anolyte and catholyte and hence achieve enforced convection, resulting in a considerable reduction in $CN^-$ polarization.

Theoretically, up to the hydraulic limit, the higher the solution flow rate, the greater will be the reduction in $CN^-$ polarization and hence the increase in the electro-oxidation efficiency. However, it has been found that as solution flow rates are increased, the increase in electro-oxidation efficiency, due to decreased $CN^-$ polarization, is offset by increased pumping costs and by a reduction in the life of the electrodes. Although solution rates as high as 5 ft/sec or higher may be used with graphite-type electrodes, satisfactory electro-oxidation power efficiencies are realized at flow rates below 1.5 ft/sec, preferably between 0.8 and 1.5 ft/sec. It will be appreciated that these flow rates also are related to the current density, as discussed in more detail below.

The process is more particularly described with reference to solutions free of materials other than water capable of producing oxidizing agents electrolytically. However, the rate of electro-oxidation of cyanide ions may be promoted by addition of small amounts of chlorides, bromides or iodides. The halide, generally chloride, may be naturally present in the waste solution being treated. The oxidation may be assisted in some instances by the addition of oxygen in air or pure form, or ozone to the electrolyte.

The mechanism of the electro-oxidation of $CN^-$ ion by the process of the present invention, where oxygen is produced electrochemically at the anode from the water, it is theorized, involves reaction between $CN^-$ and chemisorbed oxygen on the anode. The reaction scheme may be represented by the following equations:

1. Oxidation of cyanide to cyanate:
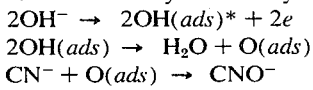
$2OH(ads) \rightarrow H_2O + O(ads)$
$CN^- + O(ads) \rightarrow CNO^-$
*(ads) indicates that the radicals are adsorbed 2. Oxidation of cyanate to nitrogen and carbon dioxide:
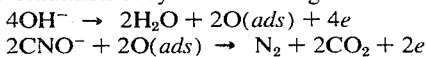
$2CNO^- + 2O(ads) \rightarrow N_2 + 2CO_2 + 2e$ 3. Overall reaction:
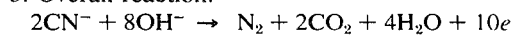

Thus, for each mole of $CN^-$ oxidized to carbon dioxide and nitrogen, there are consumed four moles of hydroxyl ion. This consumption of hydroxyl ion causes a decrease in the pH of the anolyte, and, in the absence of adequate buffering, the drop in pH could become quite large. A drop in pH would have the effect of protonating the free $CN^-$ ions to form a more difficulty-oxidizable HCN species. The effect becomes more pronounced as the pH drop increases.

Thus, a pH polarization in the anolyte and catholyte occurs and, although this problem possibly could be controlled by the addition of buffering agents, the method of the present invention is able to reduce the pH polarization of the liquid to a tolerable level without the necessity of loading the system with additional chemicals. Carbonate buffers generally are present to some degree in the cyanide wastes. The cross-mixing action of the liquid as it flows over the electrode faces causes at least partial neutralization of the anolyte and catholyte by one another.

By flowing the liquid over the electrode faces in the method of the present invention, the gases formed at the electrodes, namely the nitrogen, hydrogen and oxygen, are scrubbed from the electrode surface and are carried through the electrolyte flow path by the flowing electrolyte, thereby preventing their accumulation on the electrode surfaces. The carbon dioxide formed is substantially absorbed by the electrolyte and forms carbonates therein. The gases otherwise would tend to accumulate as bubbles and isolate large areas of the electrode faces from contact with the liquid and hence reduce the efficiency of the electro-oxidation of cyanide ions.

The flowing liquid lowers the tendency for gases to accumulate on the electrode surfaces and also acts to carry the gases out of the cell. Suspended solids present in the electrolyte may assist in the scrubbing operation. Flow rates required to achieve gas scrubbing depend largely on the current densities employed. Typical values of flow rates are 0.8 to 1.5 ft/sec. at current densities of about 15 to 40 amp.per sq.ft. respectively.

Thus, the method of the present invention involves an efficient electro-oxidation of cyanide ion-containing aqueous solutions by flowing the solution between closely spaced anode and cathode faces. The flow rate, current density and surface area of contact are carefully controlled to provide a satisfactory gas/liquid ratio at the end of the flow path and adequate mixing between anolyte and catholyte to control $CN^-$ and pH polarization, while at the same time achieving scrubbing of the gases from the electrode plates. The values preferably utilized allow rapid electro-oxidation of cyanide ion while avoiding substantial erosion of electrodes and costly pumping equipment.

It is possible, therefore, to achieve an extremely economic reduction in toxicity of cyanide wastes, involving for example, about 3 to 6 per lb. of cyanide destroyed in the case of typical cyanide wastes from heat treating in contrast to the cost involved with chemical treatments, typically alkaline chlorination.

The process of the present invention is self-limiting. The electrolytic oxidation of the cyanide ions may be continued until substantially all of the cyanide ions have been converted to nitrogen and carbon dioxide. Continued treatment of the electrolyte results only in the production of additional hydrogen and oxygen by electrolysis of the water. Therefore, it is unnecessary to exercise precise control of treatment time etc., since overtreatment is not harmful in contrast to the prior art chemical treatments, which produce secondary pollutants if very precise process parameters are not followed.

The process of the present invention may be operated over a wide range of temperatures, typically from room temperature to about 160°F, although higher temperatures up to the boiling point of the solution being treated may be utilized. The solution may be heated externally, by the power dissipated in the reactor cell or by a combination of these factors.

The process of the present invention may be carried in a number of different ways, using the cell of the present invention depending on the type and source of the waste and the conditions of operation of the cell. For example, all of the cyanide ion content of the waste solution may be destroyed in a single batch pass. Alternatively, the cyanide-containing solution may be circulated through the cell a number of times until the cyanide concentration has been reduced to an acceptable level.

A further alternative is to operate the process on a continuous basis with a cyanide waste-containing solution being treated continuously as cyanide waste is received continuously or intermittently in a reservoir for treatment. If desired, a combination of these treatments may be utilized, possibly in combination with existing chemical treatments as discussed above.

The process of the present invention is extremely simple to control, the two main variables being flow rate and current density, as discussed above. These parameters are readily set for a particular solution and cell structure. The ease of control of the process is to be contrasted to the prior art chemical treatments. Further, once the operating conditions for a particular solution have been established, skilled operation of the process is not required, also in contrast to the chemical treatment techniques. In the chemical treatments described above, careful control is required to prevent the formation of chlorine. Simple venting to atmosphere of off-gases from the cell with scrubbers to remove the small amounts of ammonia which are formed from time-to-time is all that is required in the present invention.

The process of the present invention, therefore, represents a considerable advance in the art of treatment of cyanide wastes, involving less operating costs, easy control and operation and the absence of secondary pollutants in comparison to the prior art chemical treatment methods.

The above description of the process of the present invention has been made more particularly with reference to electro-oxidation of cyanide ions in aqueous solution. The present invention may be utilized, in similar manner, to electro-oxidize other anodically electro-oxidizable ions, such as cyanate and thiocyanate ions.

The waste cyanide-containing aqueous solutions, treated by the process of the present invention to reduce their toxicity, may arise from a variety of industrial sources. For example, such solutions arise in the heat treating of steel. In such heat treating, steel generally is placed in a molten bath containing either pure sodium cyanide at a temperature of about 1,000°F or a mixture of sodium cyanide and sodium chloride at a temperature of about 1,500°F. The cyanide treatment is carried out in the presence of oxygen which causes the sodium cyanide to form carbon and nitrogen which are dissolved in the steel. Upon subsequent quenching in water to recover a surface hardened product, excess sodium cyanide is washed from the surface and hence an aqueous solution of sodium cyanide generally of a concentration less than 12,000 ppm, typically of about 2,000 to 3,000 ppm arises. By utilizing the process of the present invention, it is possible to reduce the cyanide concentration to less than 1 ppm.

The heat treating process may be the so-called "Tufftriding" process, involving aeration bath nitriding in which measured amounts of air are pumped through a molten bath containing sodium cyanide and potassium cyanide.

The novel cell of the present invention may be located in close poximity to the source of the cyanide-containing aqueous solution or may be located remote from the cyanide waste source.

The solutions which commonly arise in the heat treating process contain suspended solids. Since the electrolytes pass at a high flow rate through the cell, the present invention may readily treat such solutions containing suspended solids without a substantial risk of solid deposition in the cell.

While the present invention is primarily directed to the treatment of cyanide solutions which contain nonelectro-reducible cations, typically sodium cyanide solutions, the present invention also may be employed for the treatment of cyanide solutions in which the cation-cyanide complex is electro-reducible to metallic form, such as, copper cyanide, zinc cyanide and cadmium cyanide and, hence, the metals also are recoverable by suitable cleansing techniques, such as leaching with suitable acid, alkali or cyanide solution, or physically while the cyanide-ion level is reduced by the process of the present invention. Such wastes typically arise in hydrometallurgical and metals finishing operations.

Generally, the process of the present invention is the sole method of reduction of cyanide concentrations, although the process may be utilized in combination with chemical methods of cyanide treatment, if convenient. For example, the major portion of the cyanide ions may be destroyed by the process of the present invention and an existing alkaline chlorination process may be utilized to destroy the remainder of the cyanide ions.

Alternatively, the cyanide ions in the aqueous solution may be concentrated by any convenient physical or chemical process, including evaporation, ion exchange or adsorption. The concentrated ions then may be treated by the process of the present invention.

The invention is further described by way of illustration with reference to the accompanying drawings, in which.

Figure 1:
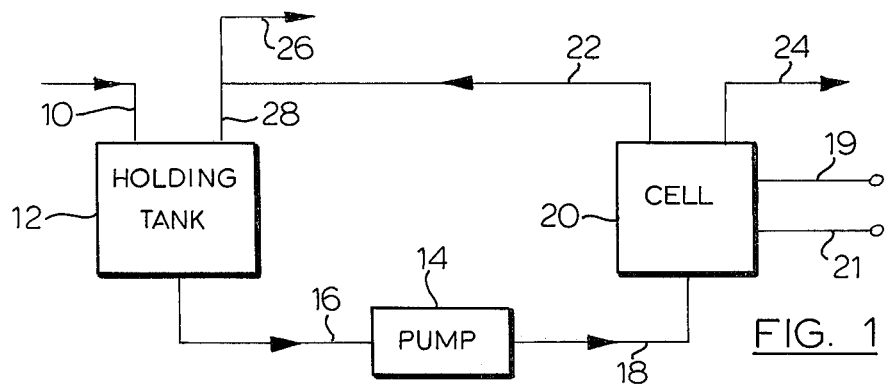
FIG. 1 is a schematic flow sheet of one embodiment of the present invention.
Figure 2:
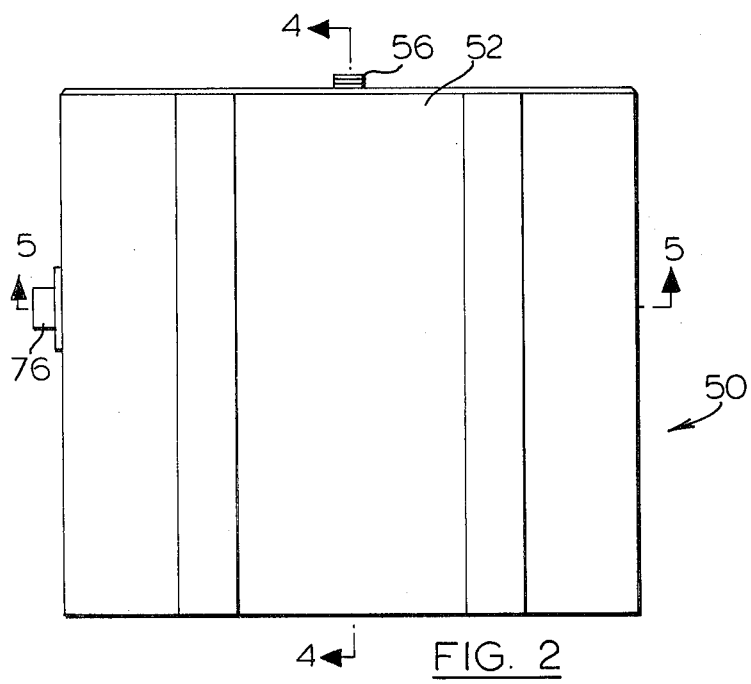
FIG. 2 is a side elevational view of one embodiment of the cell of FIG. 1.
Figure 3:
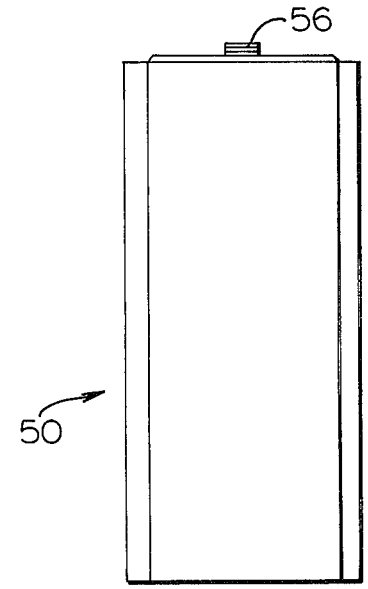
FIG. 3 is an end elevational view of the cell of FIG. 2.

Referring first to FIG. 1, an aqueous cyanide waste solution, typically an aqueous sodium cyanide solution, is fed by line 10 to a holding tank 12. This feed may be continuous or intermittent.

The aqueous cyanide solution is pumped from the holding tank 12 by pump 14 through lines 16 and 18 to an electric cell 20. Power is provided to the cell by lead lines 19 and 21 from any convenient d.c. power source. In the cell 20, the cyanide is electrochemically treated and an aqueous solution having a reduced cyanide concentration is recovered by line 22. By-product gases, generally consisting of nitrogen, together with quantities of hydrogen, oxygen and possibly ammonia, separated from the treated solution, are vented by line 24, generally by recycle of the solution to the holding tank 12 which is open to the atmosphere.

The aqueous solution in line 22 may be recovered as such by line 26, or may be recycled to the holding tank 12 by line 28 for further treatment.

Generally, the operation as described with reference to FIG. 1 is carried out continuously in one of two ways, depending on the form and conditions of operation of the cell 20.

In the first alternative, the waste material is fed continuously by line 10 to the holding tank 12 and the cyanide concentration is eliminated or reduced to an acceptable level during one pass through the cell, and hence all of the aqueous solution leaving the cell 20 by line 22 is recovered by line 26, with no recycle by line 28.

The second alternative involved intermittent feed of waste material to the holding tank 10 with recirculation of one batch of waste material by line 26 until the cyanide concentration is reduced to a satisfactory level, at which time the aqueous solution having a reduced toxicity is removed by line 26, and a further batch of waste material is received in the holding tank 12 for electrochemical processing in the cell 20.

In the cell 20, the water in the aqueous feed 18 is electrolyzed to hydrogen and oxygen, the oxygen oxidizing the cyanide ions to nitrogen and carbon dioxide, as discussed in more detail above.

Turning now to FIGS. 2 to 6, there is illustrated embodiment of a cell in accordance with the present invention utilizable as cell 20 in the process described above with reference to FIG. 1. The cell 50 includes an enclosure 52, a liquid inlet port 54 and a liquid outlet port 56. A plurality of electrodes 58, spaced apart in fixed, relative positions by electrically non-conductive spacers 60 is located within the enclosure 52.

The non-conductive spacers 60 thus cooperate with each adjacent pair of electrodes 58 to define an enclosed area. The adjacent pair of electrodes is spaced apart a short distance, as mentioned above, typically one-fourth to three-eighths inches. This spacing is most suitable when electrolytes of low electrical resistance are being treated. Smaller spacings are required when higher resistance solutions are treated, such as about one-eighth inch.

In order to provide the cell 50 with flexibility to treat solutions of different resistances without variable power losses, the electrodes 58 may be mounted so that spacing between adjacent pairs of electrodes is variable and can be chosen to provide the optimum gap for a given electrolyte at a particular power value.

The electrodes 58 in the embodiment illustrated are of two types. Four primary electrodes 62, 64, 66 and 68 are provided with the primary electrodes 62 and 66 being ganged by connector bar 70, the connector bar 70 having a terminal 72 for joining to one pole of the electrical input to the cell 50 and the primary electrodes 64 and 68 being ganged by connector bar 74, the connector bar 74 having a terminal 76 for joining to the other pole of the electrical input.

The remainder of the electrodes are secondary bipolar electrodes 78 which are charged with one face positive and the other negative.

While the cell 50 is illustrated as having four primary electrodes 62, 64, 66 and 68 and twenty-one secondary bipolar electrodes 78, this represents a typical preferred structure. The number of primary and secondary electrodes may vary considerably, depending largely on the voltage source. It is possible to provide all of the electrodes as primary electrodes or just two primary electrodes with a varying number of secondary electrodes. The use of a large number of bipolar electrodes has the distinct advantage, however, that the difficulties of connecting to thin or porous electrodes are avoided. It is preferred, therefore, to employ a multitude of bipolar electrodes with a few primary electrodes. The numbers of electrodes employed depends on the flow path length required and the dimensions of the individual electrodes.

Each electrode 58 is in the form of a flat rectangular plate and the electrodes are situated parallel to each other in substantially horizontal planes. Each electrode defines with its adjacent electrode and the spacers 60 a channel 80 through which liquid may pass across and in contact with the faces of the electrodes.

While the electrodes 58 are illustrated as being in parallel horizontal planes, this orientation represents only a preferred embodiment. It is possible for the electrodes to be located in parallel vertical planes, if desired. The latter orientation may assist in the separation of the gases from the electrolyte in the cell, but requires the venting of gases which accumulate at the top of the cell.

In the embodiment illustrated, as just described, the electrodes 58 all have a flat sheet-like substantially impervious form. It is within the scope of the invention to vary the form of some or all of the electrodes 58 from that illustrated. For example, the electrodes 58 may be in the form of closely spaced rods or slats, allowing a slight percolation of material between the electrode elements. Alternatively, the flat sheet-like electrodes may be formed to allow a small percolation of fluid through the electrode, thereby ensuring a low gas/liquid ratio at the outlet port 56.

In a further modification, the electrodes 58 may have a shaped structure, for example, a corrugated structure in which the corrugations are positioned transverse to the flow of the electrolyte. This electrode construction provides a greater surface area of electrode per unit length than a planar sheet and further provides increased agitation for the electrolyte during its passage through the cell. However, the latter electrodes are generally more costly than the illustrated sheet-like electrodes 58.

In a further modification, baffles may be provided between the electrodes 58 to increase the tortuosity of liquid flow between the electrodes, thereby providing increased turbulence for the electrolyte during its passage through the cell.

The electrodes 58 may be constructed of any convenient conductive material, although generally graphite is employed due to its cost and ready availability. Further, when made anodic, graphite has good electrocatalytic characteristics for the oxidation of cyanide, cyanate and thiocyanate. As discussed earlier, graphite gradually is worn away and the electrodes require replacing after an extended period of use. It may be desired in some instances therefore to utilize for some or all of the electrodes a material less susceptable to wear, for example, suitable metallic electrodes. Other alternatives include various composite electrodes, such as graphite-metal lamina, or crushed coke or activated carbon with a binder.

Further electrode materials which may be utilized for some or all of the electrodes 58 include a number of activated materials, such as activated carbon, or composites containing one or more catalytic agents for the conversion of the anions to the oxidized form.

A further alternative is to provide a slurry or dispersion of chargeable particles passing between the electrodes. Such particles may be naturally present in the electrolyte or may be added thereto. The presence of the chargeable particles increases the electrode surface area, with each particle or cluster of particles acting as a bipolar electrode. The spacing between the electrodes may be widened in this embodiment and a higher flow rate provided to prevent settling of solids.

Figure 6:
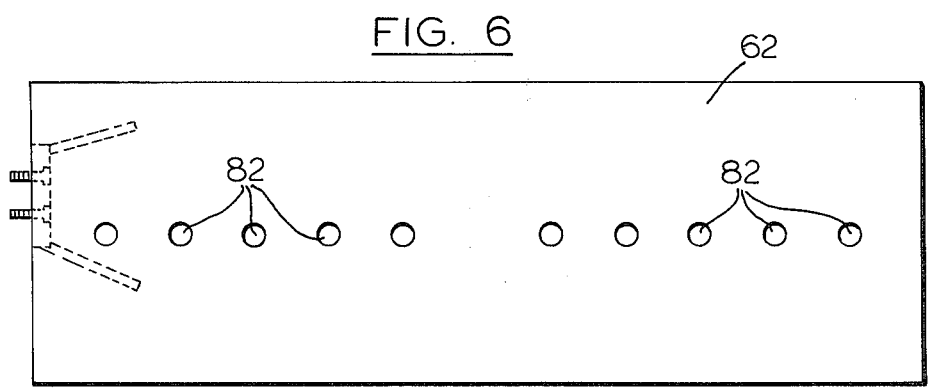
FIG. 6 is a plan view of a primary electrode of the cell illustrated in FIG. 2.

As may be seen more clearly in FIG. 6, each of the primary electrodes 62 and 68 includes a series of orifices or ports 82 passing therethrough. The orifices 82 in the electrode 62 allow liquid to pass through the electrode 62 to the channel 80 between the electrode 62 and the adjacent bipolar electrode 78. The orifices 82 in the electrode 68 allow liquid to pass through the electrode 68 from the channel 80 between the electrode 68 and the adjacent bipolar electrode.

Figure 5:
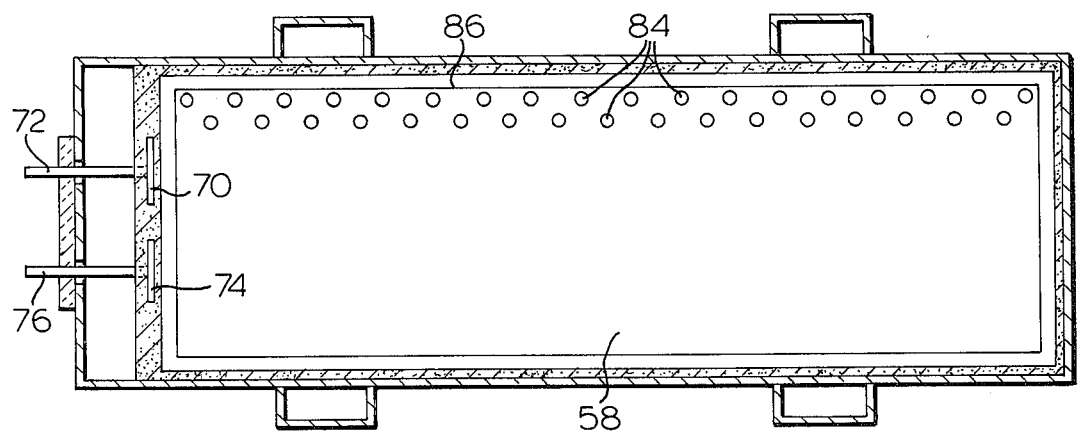
FIG. 5 is a section taken on line 5—5 of FIG. 3.

The electrodes 58 between the electrodes 62 and 68 each has the structure illustrated in FIG. 5. As shown in FIG. 5, each of the electrodes 58 is provided with a plurality of orifices or ports 84 passing therethrough and situated adjacent one side edge 86 of the electrode 58.

The orifices 82 and 84 may be of any convenient shape. Preferably, they are of circular cross-section as illustrated, for ease of formation, although they may have square, oblong, triangular, rectangular or diamond cross-section. Alternatively, a single elongated slot extending substantially the length of the electrode may be provided.

The orifices 82 are illustrated located in a straight line substantially dividing the width of the electrodes 62 and 68. This arrangement is preferred although other configurations are possible. Similarly the illustrated zig-zag arrangement of the orifices 84 is preferred for the circular cross-section orifices. For other shaped orifices 84, or for the circular cross-section orifices, other configurations may be used.

Further, the orifices 84 are located adjacent one longitudinal edge of the electrodes. This location of the orifices is convenient for the cell structure illustrated and provides an adequate flow rate therefor. It is within the scope of the invention, however, to provide the orifices 84 adjacent a lateral edge of a rectangular electrode, although this arrangement may lead to increased erosion of the electrodes.

Further, the total cross-sectional area provided by orifices 82 and 84 may be varied as desired to control the flow rate of electrolyte through the cell 50.

Figure 4:
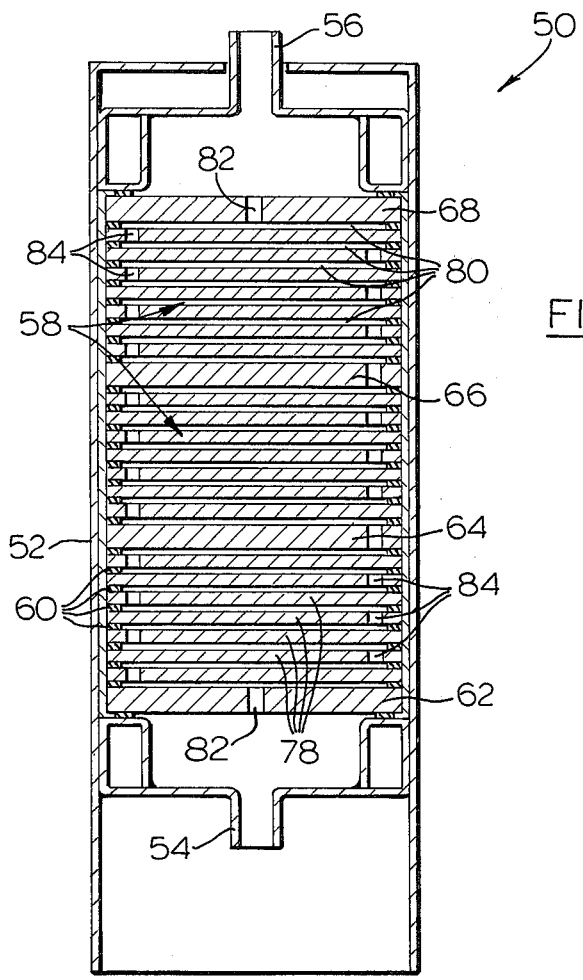
FIG. 4 is a section taken on line 4—4 of FIG. 2.

In the cell 50, the electrodes 58 between the electrodes 62 and 68 are arranged alternately with the openings 84 at opposite sides of the cell, as is illustrated in FIG. 4. By this arrangement, the liquid introduced to the enclosure 52 through inlet port 54 and passing through openings 82 in the primary electrode 62 passes across the opposed faces of each pair of electrodes 58 defining the individual channels 80.

The electrodes 58 are illustrated as having a rectangular shape and hence the cell 50 has a box-like structure and rectangular cross-section. This configuration represents only one manner of construction of a cell suitable for use in the process of the present invention. For example, circular electrodes may be provided and hence a cylindrical cell form. In such an arrangement, the liquid transfer between the channels 80 may be provided by providing peripheral ports in each alternate electrode and a single central port in the other alternate electrodes.

In some instances it may be desirable to operate at a high current density on the electrodes. As mentioned above, this may lead to the formation of undesirable quantities of gaseous products. In order to overcome this problem it is possible to operate a series of cells at high current density with separation of gas from liquid between each cell.

In operation, the solution containing anodically electro-oxidizable ions to be treated is fed to the inlet port 54 and passes through each channel 80 over the particular adjacent electrode faces defining each channel 80 and exits through outlet port 56. The hydrostatic head caused by upward flow of electrolyte maintains the cell full of liquid during operation. The electrolyte also may be passed downwardly through the cell 50, if desired, although in some instances venting problems for the gaseous products may be encountered. In some instances, combination of upward and downward flow of electrolyte may be used. A d.c. electrical supply is provided to the cell through terminals 72 and 76, connector bars 70 and 74, and the solution is electrolyzed during passage from the inlet to the outlet. The gaseous products of the electrolysis are separated from the liquid products outside the cell.

The invention is illustrated further by the following Example:

EXAMPLE

A reactor cell was set-up in the manner illustrated in FIGS. 2 to 7 and 600 Imperial gallons of an aqueous solution containing initially 2,200 ppm of free cyanide ions was circulated therethrough at a rate of 20 Imperial gallons/minute.

The cell contained three primary electrodes and 21 bipolar electrodes each of exposed surface dimension 11 × 35 inches and positioned about ¼ inch apart. A total current of 225 amps was applied to the cell giving a current density of about 28 amps/sq.ft. During the period of operation, the voltage varied between 23.5 and 21 volts, providing an average voltage of about 22 volts.

The liquid flowed through the cell across the electrode faces at a rate of about 0.87 ft/sec. The total volume of gas generated in the cell was about 16.2 litres/minute, providing a gas/liquid ratio (%) at the outlet of the cell of about 15.2 percent.

The cell was run continuously with recirculation of electrolyte for approximately 18 hours at the end of which time the concentration of free cyanide ions reached 1.0 ppm. During this time period the temperature of the electrolyte within the cell varied between 70° and 120°F, averaging about 100°F.

Modifications are possible within the scope of the invention.

The embodiments of the invention in which an exclusive property or privelege is claimed are defined as follows:

1. A method of decreasing the concentration of anodically-oxidizable species selected from free and/or complexed cyanide ions, cyanate ions and thiocyanate ions in an aqueous solution thereof which comprises:
    passing said aqueous solution along a plurality of fluidly-interconnected successive confined paths each constituted by at least one pair of electrodes having faces of opposite polarity spaced apart a distance of about 1/16 inch to 1 inch, said passage of said aqueous solution along said plurality of fluidly-interconnected successive confined paths providing a layer of liquor immediately adjacent each of said electrode faces and a bulk mass of liquor between said layers,
    applying d.c. power between said electrodes to provide a current density of less than 200 amps per sq. ft. to said electrodes, whereby an electroactive anode and an electroactive cathode are provided,
    maintaining said aqueous solution at a flow rate along said confined paths and over said electrodes less than 5 ft/sec,
    oxidizing said anodically-oxidizable species at said electroactive anode to produce materials including gaseous material,
    intermixing the layer of liquor immediately adjacent said electroactive anode with said bulk mass of said aqueous solution to minimize pH polarization and anodically-oxidizable species concentration polarization between said bulk mass and said liquor layer immediately adjacent said electroactive anode,
    scrubbing bubbles of gaseous material from both said electroactive anode and said electroactive cathode during said passage of said aqueous solution along said plurality of fluidly-interconnected successive confined paths to form a mixture of said gaseous material and said aqueous solution and to minimize the accumulation of gaseous material on said electroactive anode and electroactive cathode,
    conveying said mixture of gaseous material and aqueous solution successively along said confined paths, and
    restricting the passage of said mixture along said confined paths below a total path length above which the proportion of gas in the mixture at the extremity of said paths exceeds about 20 percent.

2. The method of claim 1 wherein said current density is from 15 to 40 amps/sq.ft.

3. The method of claim 1 wherein said flow rate is less than 1.5 ft/sec.

4. The method of claim 1 wherein said electrodes are graphite and are spaced apart a distance of about ⅛ to ⅜ inch, said flow rate is from 0.8 to 1.5 ft/sec. and said current density varies interdependently with said flow rate from 15 to 40 amps/sq.ft.

5. The method of claim 1 wherein said total path length is below that above which the proportion of gas in the mixture at the extremity of said paths exceeds about 10 percent.

6. The method of claim 4 wherein said total path length is below that above which the proportion of gas in the mixture at the extremity of said paths exceeds about 10 percent.

7. The method of claim 1 wherein said aqueous solution of anodically-oxidizable species is an aqueous solution containing sodium cyanide.

8. The method of claim 7 wherein said aqueous solution is formed in the heat treating of steel.

9. The method of claim 7 wherein said aqueous solution is formed in the aerated bath nitriding of steel.

10. The method of claim 7 wherein said aqueous solution contains up to 12,000 ppm of free and/or complexed cyanide ions.

11. The method of claim 7 wherein said aqueous solution is metal cyanide waste from a hydrometallurgical or a metals finishing operation.

\* \* \* \* \*